Aug. 27, 1968

I. M. BERGER 3,398,807

VEHICLE DRIVE

Filed Feb. 7, 1966

INVENTOR
IRVING M. BERGER
BY
Hubbell, Cohen, Stiefel & Siddler
ATTORNEYS.

United States Patent Office 3,398,807
Patented Aug. 27, 1968

3,398,807
VEHICLE DRIVE
Irving M. Berger, 1 Constitution St.,
Bristol, R.I. 02809
Filed Feb. 7, 1966, Ser. No. 525,519
7 Claims. (Cl. 180—64)

ABSTRACT OF THE DISCLOSURE

A wheeled vehicle chassis having a chassis frame with drive wheels thereon with an engine mounting base cradle secured to the frame with a floating cradle supported on the base cradle by means of vibration damping elements, and an engine on the floating cradle having a drive shaft coupled to a friction disc, with a clutch frame pivotally supported on said chassis, and rotatably supporting a clutch wheel for movement to and from said friction disc, with said clutch wheel coupled to the drive wheel of said chassis.

---

Figures 1, 2:
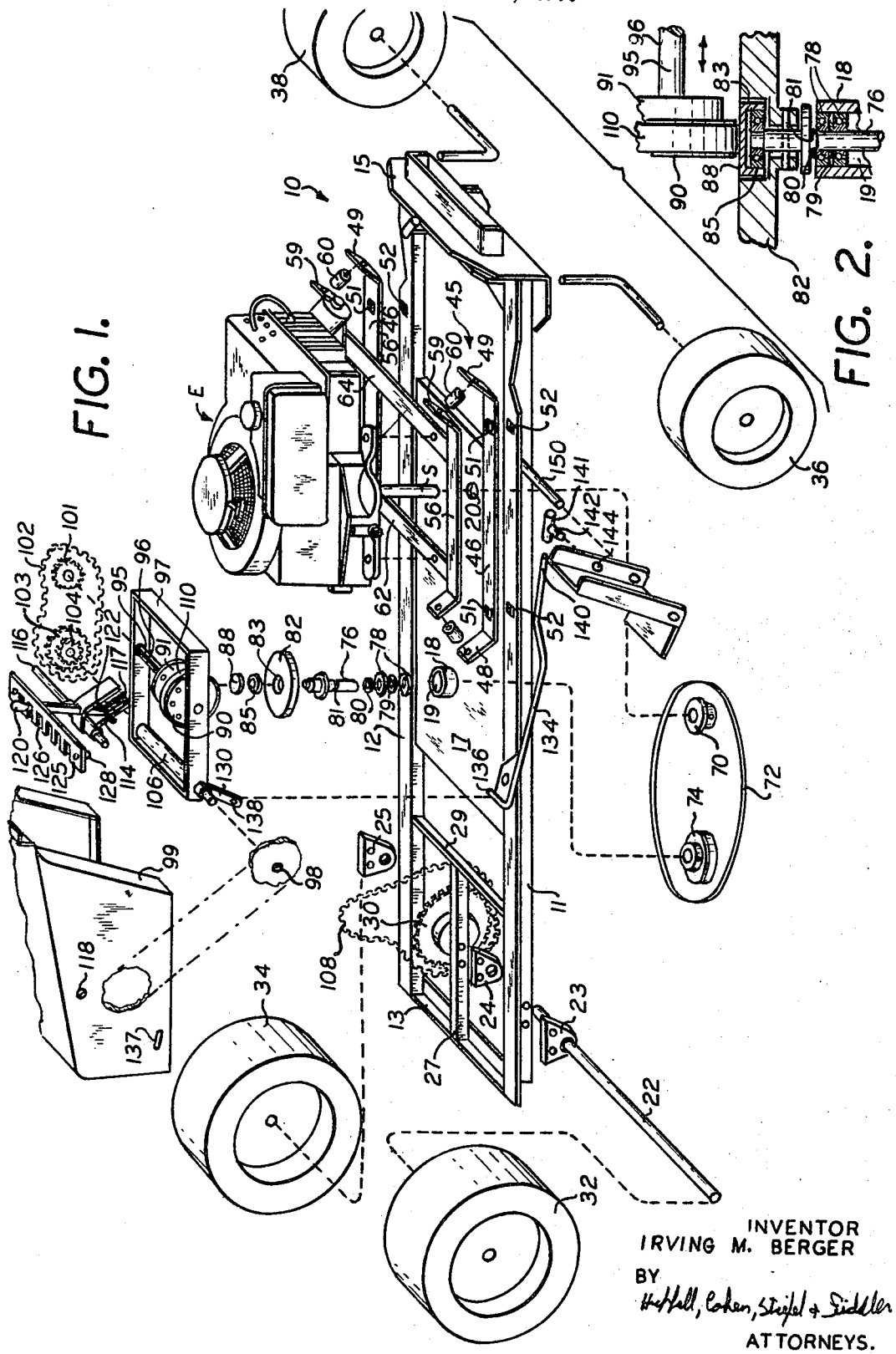

This invention relates to the art of vehicle drives, more particularly to an improved chassis arrangement for supporting an internal combustion engine in relatively vibration free isolation along with a transmission facilitating the controlled transmission of the driving energy of the engine to the wheels of the vehicle in connection with which the chassis is employed.

A variety of vehicles have been evolved utilizing relatively high powered internal combustion engines supported on relatively small chassis so that the normal vibrational energy of the engine tends to deteriorate the chassis and the other vehicle components. Thus the mounting of a drive engine on a tractor necessitates the fabrication of the tractor of relatively heavy structural components increasing the cost, and the dangers involved in utilization of the tractor. In attempting to fabricate a vehicle such as a tractor in an economical fashion so as to permit utilization of the tractor by a relatively large market, it is further desirable to minimize the complexity of the transmission mechanism, and to insure the fact that the mechanism lends itself to ready home maintenance and is subject to simple utilization with minimal driving skill.

It is with the above considerations in mind that the present improved vehicle chassis including an internal combustion engine mount and transmission have been evolved in which the engine is subject to relatively vibration free isolation with respect to the vehicle, and the transmission is of a simple, relatively inexpensive nature, subject to ready maintenance and permitting easy selection of a wide variety of driving speeds as well as a neutral and braking position.

It is according among the primary objects of this invention to provide an improved vehicle chassis subject to fabrication of relatively light weight, inexpensive structural components as a result of which the chassis may be employed in connection with a vehicle adopted for widespread commercial distribution.

Another object of the invention is to provide a vehicle chassis with an improved vibration isolating motor mounting, which permits use of lighter weight structural elements in the chassis.

A further object of the invention is to provide a vehicle chassis with a transmission having few relatively inexpensive readily maintainable components which permits the user to selectively determine the power to be transmitted from an engine on said chassis to the drive wheels of the chassis.

A further object of the invention is to provide a chassis with a transmission in which the selective positioning of the transmission components permits utilization of the transmission as a brake.

It is also an object of the invention to provide means minimizing wear in a disc transmission.

A further object of the invention is to provide an improved vehicle chassis in which a single control member may be employed to selectively attain desired speed changes or braking action.

These and other objects of the invention, which will become hereafter apparent, are achieved by forming a chassis with two spaced frame components adapted for fabrication from conventional structural members such as angle iron or the like. A vibration isolating engine mounting is supported on the spaced frame components. The engine mount comprises a fixed cradle formed of two spaced cradle members having upstanding arms on their ends extending at an angle to the base of the cradle member. One cradle member is secured to each of the spaced frame components. Supported on the fixed cradle is a floating cradle which is geometrically similar in contour to the fixed cradle and is secured to the fixed cradle by shock mounts arranged between the cradle arms of the fixed and floating cradle. The arms of the cradles extend at an angle other than 0 or 90° with respect to the chassis so that any forces transmitted from the engines to the chassis must be resolved into both a vertical and horizontal component which is less in magnitude than the vibrational force. Supporting cross members are extended between the floating cradle base, and the engine is secured to these cross members. The drive shaft of the engine is coupled to a rotatably mounted friction disc on the chassis. A driven clutch wheel is rotatably mounted in a plane at 90° to the plane of the friction disc, and this clutch wheel is rotatably supported in a frame member which is pivotally supported with respect to the chassis. The clutch wheel is rotatably and slidably supported on a slide shaft so that the wheel may be selectively positioned to contact the friction disc at varying points outwardly from its center. The center of the friction disc is formed with an independently rotatably bearing seat which provides a neutral idler position for the transmission. The clutch wheel frame member is supported in a housing in which is mounted a stepping bracket. The bracket is formed with an abutment surface adapted for contact by the clutch wheel when the frame member is elevated to displace the clutch wheel from engagement with the friction disc. As a result of the engagement of the clutch wheel with the abutment, rotation of the clutch wheel is discontinued and affirmatively stopped to brake the drive wheels on the chassis. The rotational energy of the clutch wheel is transmitted to the rear wheels of the chassis for driving.

One of the features of the invention resides in the arrangement of the cradle arms at an angle other than 0° or 90° with respect to the chassis so that any vibrational forces transmitted from the supported engine to the chassis will be resolved into both horizontal and vertical components which are of lesser magnitude than the direct force component produced by the vibration.

Another feature of the invention resides in the provision of the idler bearing seat on the friction disc so that when the clutch wheel is in the dead center position with respect to the friction disc there will be no wear on the friction surface of either the disc or clutch wheel.

Another feature of the invention resides in the arrangement of the braking abutment on the stepping bracket for engagement by the clutch wheel so that by the simple application of pedal pressure with one foot such as is necessitated in attempting to change drive speed the vehicle in connection with which the chassis is employed may if desired be braked.

The specific details of a preferred embodiment of the invention, and their mode of functioning, will be particularly pointed out in clear, concise and exact terms in conjunction with the accompanying drawings, wherein:

FIG. 1 is an exploded perspective view of a chassis made in accordance with the teachings of this invention; and FIG. 2 is an enlarged detail cross-sectional view through the idler bearing seat on the friction disc.

Referring now more particularly to the drawings, the chassis 10 is seen to comprise two spaced longitudinally extending frame components 11 and 12 which extend along opposite sides of a longitudinal axis of the chassis. Frame components 11 and 12 are formed of conventional structural elements such as angle iron or the like, and are maintained in their desired relatively spaced position by means of back cross piece 13 and front plate 15. Back cross piece 13 is as illustrated preferably formed of angle iron which is welded to the frame components 11 and 12. Similarly, front plate 15 is contoured as shown and welded to the front ends of the frame component. In the illustrated embodiment, a deck plate 17 of sheet steel or the like is arranged between the frame components 11 and 12. This deck plate 17 is formed with a bearing collar 18 surrounding a spindle opening 19. Another deck plate opening 20 is formed forwardly of bearing collar 18.

At the rear end of the chassis 10, a rear axle 22 is rotatably supported in bearing flanges 23, 24 and 25, which are secured to the chassis frame. Bearing flange 24 is secured to longitudinally extending strut 27 which extends from back cross piece 13 to intermediate cross piece 29. A driven sprocket wheel 30 is fixed to axle 22 for rotation therewith, and rear drive wheels 32 and 34 are fixed in appropriate fashion to the ends of the rear axle 22.

Front wheels 36 and 38 are mounted on front axles 39 and 40, respectively, which are secured to the front of the chassis to permit steering of said front wheels in a conventional fashion not here illustrated.

An engine mounting cradle assembly 45 is arranged over chassis deck 17 to permit vibration free mounting of an internal combustion engine E. This cradle assembly comprises a pair of substantially identical cradle base members 46 having upstanding cradle arms 48 and 49 extending at an angle of greater than 0° and less than 90° to the chassis frame components 11 and 12. It is preferred that these cradle arms 48 and 49 extend at an angle of 45° with respect to the chassis frame components, as illustrated, and an angle of between 20° and 70° is found satisfactory. A cradle member base 46 is secured as illustrated to chassis frame components 11 and 12 respectively and held in place by means of appropriate fastening members extending through the aligned apertures 51 and 52 in the cradle member and chassis member respectively. A pair of floating cradle members 56 geometrically similar to base cradle members 46 with arms 58 and 59 extending parallel to arms 48 and 49 is arranged above cradle members 46 and the arms 58 and 59 of the floating cradle 56 are mounted with respect to arms 48 and 49 respectively of cradle base members 46 by means of shock mountings 60 which in the illustrated embodiment of the invention are mounts of the type in which a threaded stud is extended through a rubber collar with the stud portions extending through apertures in the cradle arms 48 and 58 and the rubber collar provides a cushion between cradle arms 48 and 58. Cradle cross pieces 62 and 64 are extended between the floating cradle members 56, and an engine E of one of a wide variety of types is secured to the supporting cross members 62 and 64 with the drive shaft S of the engine extending through deck aperture 20.

At the lower end of engine shaft S a drive pulley 70 is secured, and the rotational energy of drive pulley 70 is transmitted via belt 72 to driven pulley 74 which is fastened to driven spindle 76 which extends through the opening 19 in bearing collar 18 of deck 17. As best seen in FIG. 2, spindle bearings 78 held apart by the spacer ring 79 are press fit in collar 18, and the spindle 76 is maintained in position in the bearings 78 by snap ring 80 engaging in undercut 81 on the spindle. Mounted on the spindle 76 for rotation therewith is a friction disc 82 which is formed with a central recess 83 dimensioned to accommodate a ball bearing assembly 85, the inner race of which is press fit onto the upper end of spindle 76. Bearing cover 88 is press fit over the outer race of the bearing. The bearing cover 88 provides an idler seat for clutch wheel 90, and is dimensioned to rotate freely within the recess 83 in friction disc 82 for a purpose to become hereafter apparent.

The clutch wheel 90 having a flanged hub 91 is mounted on splined slide shaft 95 having slideway 96 within which a key (not shown) is arranged so that clutch wheel 90 rotates with shaft 95, but is free to slide laterally thereover. Slide shaft 95 is mounted for rotation in clutch frame member 97 which is pivotally supported for free rotational movement in the openings 98 in the side walls of housing 99 (as shown in the broken exploded part of the housing). The housing 99 is secured to the chassis frame. A sprocket wheel 101 is fixed to an end of shaft 95 extending out of the frame member 98 and a sprocket chain 102 is trained over sprocket wheel 101 and the outer driven sprocket wheel 103 which is mounted for rotation with inner idler sprocket 104 which is mounted for rotation on shaft 106 in frame member 98. Sprocket chain 108 is trained over inner idler sprocket 104 and driven sprocket 30 on axle 22 so that rotation of shaft 95 may be transmitted to rear axle 22, and drive wheels 32 and 34.

The clutch wheel 90 is provided with a friction rim in the nature of a removable tire 110 formed of rubber, or the like elastic friction material, and as will be apparent from the drawings, the width of the friction tire 110 is less than the diameter of idler bearing seat 88.

A clutch shifting yoke 114 is slidably mounted on slide rod 116 which is supported in openings 118 in the sidewalls of housing 99. Yoke 114 has fork 117 straddling hub 91, and a control handle 120 is pivoted on yoke 114 against the forked rear wall of the yoke (to the left as viewed in FIG. 1) with spring 122 biasing the control lever 120 (to the right as viewed in FIG. 1). Yoke 114 is slidably mounted on rod 116 for lateral movement with respect to the axis of the chassis, with the upper end of control lever 120 movable in stepping bracket 125.

Stepping bracket 125 is formed with a plurality of spaced slots 126 within which the upper end of control handle 120 may be engaged. The lower surface of stepping bracket 125 is formed with a braking detent 128 against which clutch wheel 90 may be abutted.

Shifting of the clutch wheel 90 with respect to friction disc 82 is accomplished by pivoting clutch frame 97 in housing 99 to move the clutch wheel 90 out of contact with the friction disc 82. To this end, the clutch frame 97 is formed with a bell crank lever 130 fixed to shaft 106 which is fixed in frame member 97. The bell crank lever 130 is fixed to the outwardly extending end of shaft 106 opposed to the end to which idler sprocket 104 is secured, as best seen in FIG. 1. Attached to the free end of bell crank lever 130 is connecting rod 134 formed with an inturned end 136 which extends through slot 137 in housing 99. The inturned connecting rod end 136 is extended through opening 138 at the free end of bell crank lever 130 and pivotally secured thereto by means of a cotter pin or the like. The end 140 of connecting rod 134 opposite the inturned end 136 is threaded for engagement with internally threaded T collar 141 which has a leg 142 passing through an aperture 144 in pedal 146 at a point spaced from the pivot axis of the pedal 146. Pedal 146 is pivotally mounted on stud 150 which extends outwardly from chassis frame member 11 and is fixedly secured thereto by welding or the like.

*Operation*

In use, the aforedescribed chassis construction permits fabrication of a vehicle chassis for use in connection with a tractor, or the like, suitable for the average home owner.

The mounting of the internal combustion engine E on the floating cradle results in a minimum of transmission of vibration forces between the engine and the vehicle chassis, as a result of which the chassis components may be made significantly lighter and less costly. This function flows from the fact that all forces transmitted by the engine to the chassis are transmitted via the isolators 60 to the cradle arms which are at an angle to the chassis frame so that each force is resolved into components of a lesser magnitude than that of the force.

The engine drive power is transmitted to the rear drive wheels 32 and 34 by means of a simple readily controllable and readily maintainable transmission. Thus the rotative energy of engine shaft S is initially transmitted via drive wheel 70 and belt 72 through drive wheel 74 which rotates spindle 76 on which friction disc 82 is mounted. Depending on the distance of the point of contact of clutch wheel 90 from the center of the friction disc 82, the rate of rotation of the clutch wheel 90 may be varied. Thus though the friction disc 82 rotates at a fairly constant speed depending on the rate of rotation of engine shaft S, which speed is varied only by the amount of gas fed to the engine, the driving ratio between the engine shaft S and the clutch 90 may be selectively varied. When the tire 110 of clutch wheel 90 is positioned to contact the friction wheel 82 near its edge, clutch wheel 90 will rotate at a much greater speed than when the clutch wheel 90 is moved towards the center of the friction disc 82.

In the dead center position of the disc, the clutch wheel 90 will theoretically not be rotated at all, thus providing an idler setting for the transmission. As a practical proposition, however, conventional disc transmissions are found to produce undue wear on the friction tire 110 necessitating frequent tire replacement, and producing undesired chatter in the idler position. Since the ideal point contact between the friction disc 82 and the clutch wheel 90 cannot be obtained, this wear and chatter has been eliminated in accordance with the teachings of this invention by providing an idler bearing 85 with cap 88. The dimensions of cap 88 are such that the area contact normally encountered between tire 110 of clutch wheel 90 and the friction disc 82 is fully encompassed by the cap 88. Since this cap 88 rotates freely with respect to the friction disc, when the clutch wheel is at rest at the idling dead center position, the area of contact is fully accommodated by the cap 88 and there is no tire wear or chatter resulting from the continued motion of the friction disc with respect to the clutch wheel 90.

When it is desired to change transmission ratios by moving the clutch wheel 90 with respect to the center of the friction disc, the pedal 146 is depressed causing rod 134 to pull on the free end of bell crank lever 130 pivoting clutch frame 97 about the pivot points 97 in housing 99 thus raising the clutch plate 90 away from the friction disc 82. Once the clutch wheel 90 is disengaged from friction disc 82, the control handle 120 may be actuated to slide the clutch wheel 90 along the splined shaft 95 to any position with respect to the center of rotation of the friction disc 82. Since it is often desired to slow down the vehicle, or perhaps bring it to a stop while the transmission is being shifted, in addition to other brake means that may be provided, according to the instant invention, the clutch wheel 90 is brought against braking detent 128 by continued downward pressure on pedal 146 so that the clutch frame 97 brings the tire 110 of clutch wheel 90 against the braking detent 128 which stops the rotation of the clutch wheel 90 and thus also stops the rotation of the rear wheels 32 and 34 which are coupled to the clutch wheel 90 via shaft 22, sprocket wheel 30, sprocket chain 108, sprocket wheel 103, sprocket chain 102 and sprocket wheel 101 on clutch shaft 95.

It is thus seen that a simple chassis arrangement has been provided for mounting of the engine, and transmitting engine drive forces to the drive wheels of a vehicle which minimize vibration and shock load resulting from engine vibration and transmission shifting forces, which reduction in vibration and shock load permits fabrication of the vehicle chassis of relatively inexpensive materials, thus minimizing costs.

The above disclosure has been given by way of illustration and elucidation, and not by way of limitation, and it is desired to protect all embodiments of the herein disclosed inventive concept within the scope of the appended claims.

What is claimed is:

1. A wheeled vehicle chassis comprising a chassis frame with drive wheels thereon; an engine mounting base cradle secured to said frame; upstanding arms on said base cradle lying in a plane other than 0° or 90° with respect to the chassis, a floating cradle movably supported between said arms on said base cradle; vibration damping elements between said floating cradle and said base cradle; an engine having a driving shaft on said floating cradle; a friction disc rotatably mounted on said chassis; a driving connection between the engine drive shaft and said friction disc; a clutch frame pivotally supported on said chassis; a clutch wheel rotatably supported in said frame for movement against said friction disc, said clutch wheel drivingly connected to the drive wheels on said chassis; an idler bearing mounted at the center of said friction disc for free rotation with respect to said friction disc; and a friction element adapted for engagement by said clutch wheel when said clutch frame is raised, to stop the rotation of said clutch wheel.

2. A chassis as in claim 1 in which said idler bearing comprises a ball bearing having an inner race coupled for movement with said friction disc; an outer race freely rotatable with respect to said friction disc; and a cap overlying said bearing in the recess in said friction disc, with an upper surface of said cap lying in the plane of the top surface of said friction disc.

3. A chassis as in claim 1 having: a bell crank lever secured to said clutch frame; a connecting rod, one end of which is coupled to said lever; and a pedal pivotally mounted on said chassis with said connecting rod secured to said pedal at a point spaced from the pivot axis of said pedal, whereby stepping on said pedal will raise said clutch frame.

4. A chassis as in claim 1 having: a housing enclosing said clutch frame; a shaft rotatably mounted in said housing, on which said clutch wheel is slideable; and a control handle extending from said housing, coupled to said clutch wheel.

5. A chassis as in claim 4 in which said housing is formed with a stepping bracket having spaced slots through which said handle extends; and a braking detent adjacent said slots forming said friction element.

6. A transmission for transferring rotative energy from a first shaft to a second shaft, said transmission comprising a friction disc coupled to the first shaft for rotation herewith, a clutch wheel coupled to the second shaft for rotation therewith, said clutch wheel positioned for movement between a position in which the edge of said clutch wheel contacts the surface of said friction disc and a point remote therefrom; a mounting for said clutch wheel supporting said clutch wheel for transverse shifting along a diametral axis of said friction disc, said mounting comprising a pivotally mounted frame member, and a shaft on said frame member rotatably supporting said clutch wheel, and permitting shifting of said clutch wheel when said frame is pivoted away from said drive wheel: a clutch shifting mechanism including a yoke slidably mounted on a fixed slide rod, said yoke contacting against said clutch wheel to shift same with respect to said friction disc while permitting relative movement between said yoke and clutch wheel; and an idler bearing mounted concentrically with said friction disc, said bearing having a portion rotating independently of said friction disc, whereby when said clutch wheel is positioned to contact the center of the friction disc, there will be no wear or chatter between the friction disc and clutch wheel.

7. In a disc transmission having a friction disc and clutch wheel, said clutch wheel rotatably supported in a pivotally mounted clutch frame so that the edge of the clutch wheel contacts the surface of the disc at one position of the frame and is remote from the friction disc in another position: a clutch shifting mechanism including a yoke slidably mounted on a fixed slide rod, said yoke contacting against said clutch wheel to shift same with respect to said friction disc while permitting relative movement between said yoke and clutch wheel; a brake for said clutch wheel comprising: an abutment positioned at the position of the clutch wheel remote from the friction disc; and means shifting said clutch wheel on said mounting to said position remote from the friction disc to bring said clutch wheel against said abutment.

References Cited
UNITED STATES PATENTS

| | | | |
|---|---|---|---|
| 585,251 | 6/1897 | Bird | 180—70 |
| 668,074 | 2/1901 | Worth | 180—70 |
| 708,356 | 2/1902 | Hennegin | 74—197 |
| 807,623 | 12/1905 | Lambert | 180—70 |
| 848,593 | 3/1907 | Hatfield | 74—197 |
| 2,020,597 | 11/1935 | Appel | 180—64 |

BENJAMIN HERSH, *Primary Examiner.*

MILTON L. SMITH, *Examiner.*